United States Patent
Castane Selga et al.

(10) Patent No.: US 10,208,760 B2
(45) Date of Patent: Feb. 19, 2019

(54) ROTARY MACHINE INCLUDING ACTIVE MAGNETIC BEARING

(71) Applicant: General Electric Company, Schenectady, NY (US)

(72) Inventors: Rosa Castane Selga, Bavaria (DE); Mohamed Osama, Bavaria (DE); Thomas Alban, Chatenoy le Royal (FR); Massimiliano Ortiz Neri, Pisa (IT)

(73) Assignee: General Electric Company, Schenectady, NY (US)

( * ) Notice: Subject to any disclaimer, the term of this patent is extended or adjusted under 35 U.S.C. 154(b) by 92 days.

(21) Appl. No.: 15/222,263

(22) Filed: Jul. 28, 2016

(65) Prior Publication Data
US 2018/0030989 A1 Feb. 1, 2018

(51) Int. Cl.
*G05B 19/00* (2006.01)
*F01D 17/00* (2006.01)
(Continued)

(52) U.S. Cl.
CPC .......... *F04D 29/058* (2013.01); *F01D 17/00* (2013.01); *F01D 25/16* (2013.01); *F04D 17/10* (2013.01);
(Continued)

(58) Field of Classification Search
CPC ...... F04D 29/058; F04D 17/10; F04D 27/003; F04D 27/009; F04D 29/284; F04D 29/30;
(Continued)

(56) References Cited

U.S. PATENT DOCUMENTS 5,355,042 A  10/1994  Lewis et al.
5,574,345 A  11/1996  Yoneta et al.
(Continued)

FOREIGN PATENT DOCUMENTS

AU   2003269647 B2   6/2004
AU   2008290428 A1   2/2009
(Continued)

OTHER PUBLICATIONS

"OptiComp* Compressor Control Suite," Retrieved from the Internet URL: https://www.gemeasurement.com/sites/gemc.dev/files/gea30389a_opticompbrochure_printed_r2.pdf, pp. 1-16 (2015).
(Continued)

*Primary Examiner* — Ronald D Hartman, Jr.
(74) *Attorney, Agent, or Firm* — GE Global Patent Operation; Marc A. Vivenzio

(57) ABSTRACT

A controller for a rotary machine includes a processor and a memory coupled to the processor. The memory is configured to store operating modes of the controller. The operating modes include a normal operating mode and a fault tolerant operating mode. The controller is configured to receive a signal from at least one sensor and determine an operating state of the rotary machine based on the signal. The controller is also configured to switch the operating modes based on the determined operating state of the rotary machine and regulate at least one electromagnetic bearing and at least one flow control device. The controller is further configured to adjust at least one of the at least one electromagnetic bearing and the at least one flow control device in the fault tolerant operating mode.

13 Claims, 5 Drawing Sheets

(51) Int. Cl.
  *F04D 17/10* (2006.01)
  *F04D 29/058* (2006.01)
  *F04D 27/00* (2006.01)
  *F04D 29/28* (2006.01)
  *F04D 29/30* (2006.01)
  *F04D 29/58* (2006.01)
  *G05B 19/042* (2006.01)
  *G05B 19/10* (2006.01)
  *F01D 25/16* (2006.01)

(52) U.S. Cl.
  CPC ......... *F04D 27/003* (2013.01); *F04D 27/009* (2013.01); *F04D 29/284* (2013.01); *F04D 29/30* (2013.01); *F04D 29/582* (2013.01); *G05B 19/0428* (2013.01); *G05B 19/106* (2013.01); *F05D 2240/515* (2013.01); *F05D 2270/10* (2013.01); *F05D 2270/101* (2013.01)

(58) Field of Classification Search
  CPC . F04D 29/582; G05B 19/0428; G05B 19/106; F01D 17/00; F01D 25/16; F05D 2270/10; F05D 2240/515; F05D 2270/101
  See application file for complete search history.

(56) References Cited

U.S. PATENT DOCUMENTS

| | | | |
|---|---|---|---|
| 5,578,880 A | 11/1996 | Lyons et al. | |
| 2002/0047402 A1* | 4/2002 | Taniguchi | F16C 32/0444 310/90.5 |
| 2003/0038553 A1 | 2/2003 | Andres et al. | |
| 2003/0152462 A1* | 8/2003 | Yaegashi | F04D 29/048 417/42 |
| 2010/0327687 A1* | 12/2010 | Iannello | F16C 32/0442 310/90.5 |
| 2011/0238172 A1* | 9/2011 | Akdis | A61M 1/101 623/3.11 |
| 2012/0000204 A1* | 1/2012 | Kesseli | F02C 3/107 60/778 |
| 2012/0001507 A1 | 1/2012 | Sears | |
| 2012/0100011 A1 | 4/2012 | Sommer et al. | |
| 2014/0234139 A1 | 8/2014 | Sakawaki et al. | |
| 2014/0303779 A1 | 10/2014 | Zhu et al. | |
| 2014/0303780 A1 | 10/2014 | Zhu et al. | |
| 2015/0010383 A1 | 1/2015 | Sun et al. | |
| 2015/0260221 A1* | 9/2015 | Anders | F01D 17/02 384/448 |

FOREIGN PATENT DOCUMENTS

| | | |
|---|---|---|
| CN | 103635697 A | 3/2014 |
| DE | 10005246 C1 | 10/2001 |
| DE | 10 2011 051 322 A1 | 1/2012 |
| DE | 102010022000 A1 | 6/2012 |
| EP | 0473232 A1 | 3/1992 |
| EP | 0521007 A1 | 1/1993 |
| EP | 1085224 B1 | 7/2005 |
| EP | 1596080 B1 | 5/2008 |
| EP | 2390511 A1 | 11/2011 |
| EP | 2446160 A2 | 5/2012 |
| EP | 2006556 B1 | 11/2013 |
| EP | 2659277 A2 | 11/2013 |
| EP | 2 738 406 A1 | 6/2014 |
| GB | 1 525 489 A | 9/1978 |
| GB | 2297361 A | 7/1996 |
| IN | 228421 | 3/2007 |
| JP | 09166141 A | 6/1997 |
| JP | 10047346 A | 2/1998 |
| JP | 2003222096 A | 8/2003 |
| JP | 2006009758 A | 1/2006 |
| WO | 9114853 A1 | 10/1991 |
| WO | 2007067065 A1 | 6/2007 |
| WO | 2009024740 A1 | 2/2009 |
| WO | 2011005552 A2 | 1/2011 |
| WO | 2013109235 A2 | 7/2013 |
| WO | 2014193238 A1 | 12/2014 |
| WO | 2015035871 A1 | 3/2015 |
| WO | 2015043785 A1 | 4/2015 |

OTHER PUBLICATIONS

International Search Report and Written Opinion issued in connection with corresponding PCT Application No. PCT/US2017/037630, dated Oct. 18, 2017.

Yoon, et al., "Control of Compressor Surge with Active Magnetic Bearings," 49th IEEE Conference on Decision and Control (CDC), Dec. 15-17, 2010, Hilton Atlanta Hotel, Atlanta, Georgia, US, pp. 4323-4328.

Yoon et al., "Control of Surge in Centrifugal Compressors by Active Magnetic Bearings", Advances in Industrial Control, Springer, pp. 1-292, 2013.

* cited by examiner

ROTARY MACHINE INCLUDING ACTIVE MAGNETIC BEARING

BACKGROUND

The field of the invention relates generally to rotary machines, and more particularly, to rotary machines including active magnetic bearing (AMB) systems.

Active magnetic bearing systems are used in rotary machines for providing non-contact support of a rotating piece, i.e., a rotor. Sometimes the rotor experiences loads that are greater than the capacity of the active magnetic bearing system. Accordingly, rotary machines include auxiliary mechanical bearings, i.e., landing bearings, to receive the rotor when the loads on the rotor exceed the capacity of the active magnetic bearing system. However, the loads on the rotor that exceed the capacity of the active magnetic bearing system result in contact between the landing bearings and the rotor, i.e., rotor landings.

Sometimes, the rotary machines experience conditions that may introduce loads approaching, and potentially exceeding, the design capacity of the active magnetic bearing system and increase a potential for rotor landings. At least some known rotary machines include a localized controller to account for high dynamic loads. However, the localized controllers are inefficient in accounting for some load variations. In addition, the localized controllers do not account for high static loads such as those introduced by, e.g., near choke area or high volume flow area conditions associated with a compressor. Moreover, at least some known controllers operate within long-term operating parameters that limit the performance and efficiency of the rotary machine.

BRIEF DESCRIPTION

In one aspect, a controller for a rotary machine is provided. The controller is coupled to at least one electromagnetic bearing, at least one sensor, and at least one flow control device. The controller includes a processor and a memory coupled to the processor. The memory is configured to store operating modes of the controller. The operating modes include a normal operating mode and a fault tolerant operating mode. The controller is configured to receive a signal from the at least one sensor and determine an operating state of the rotary machine based on the signal. The controller is also configured to switch the operating modes based on the determined operating state of the rotary machine and regulate the at least one electromagnetic bearing and the at least one flow control device. The controller is further configured to adjust at least one of the at least one electromagnetic bearing and the at least one flow control device in the fault tolerant operating mode.

In another aspect, a method of operating a rotary machine is provided. The method includes rotating a rotor, providing current to at least one electromagnetic bearing supporting the rotor, and detecting an operating characteristic of the rotary machine. The method also includes determining, using a controller, an operating state of the rotary machine based on the detected operating characteristic and retrieving operating modes stored in a memory of the controller. The operating modes include a normal operating mode and a fault tolerant operating mode. The method further includes switching the operating modes of the controller based on the determined operating state of the rotary machine, regulating, using the controller, operation of the at least one electromagnetic bearing, and regulating, using the controller, operation of at least one component of the rotary machine other than the at least one electromagnetic bearing.

In another aspect, a rotary machine is provided. The rotary machine includes a rotor and a drive component coupled to the rotor and configured to induce rotation of the rotor. The rotary machine also includes at least one electromagnetic bearing configured to support a portion of said rotor, at least one sensor configured to detect an operating characteristic of said rotary machine, at least one flow control device, and a controller. The controller is coupled to the at least one electromagnetic bearing, the at least one sensor, and the at least one flow control device. The controller is configured to regulate the at least one electromagnetic bearing and the at least one flow control device. The controller includes a processor; and a memory coupled to the processor. The memory is configured to store operating modes of the controller. The operating modes include a normal operating mode and a fault tolerant operating mode. The controller is further configured to receive a signal from the at least one sensor and determine an operating state of the rotary machine based on the signal. The controller is also configured to switch the operating modes based on the determined operating state of said rotary machine and adjust at least one of the at least one electromagnetic bearing and the at least one flow control device in the fault tolerant operating mode.

DRAWINGS

These and other features, aspects, and advantages of the present disclosure will become better understood when the following detailed description is read with reference to the accompanying drawings in which like characters represent like parts throughout the drawings, wherein.

Figure 1:
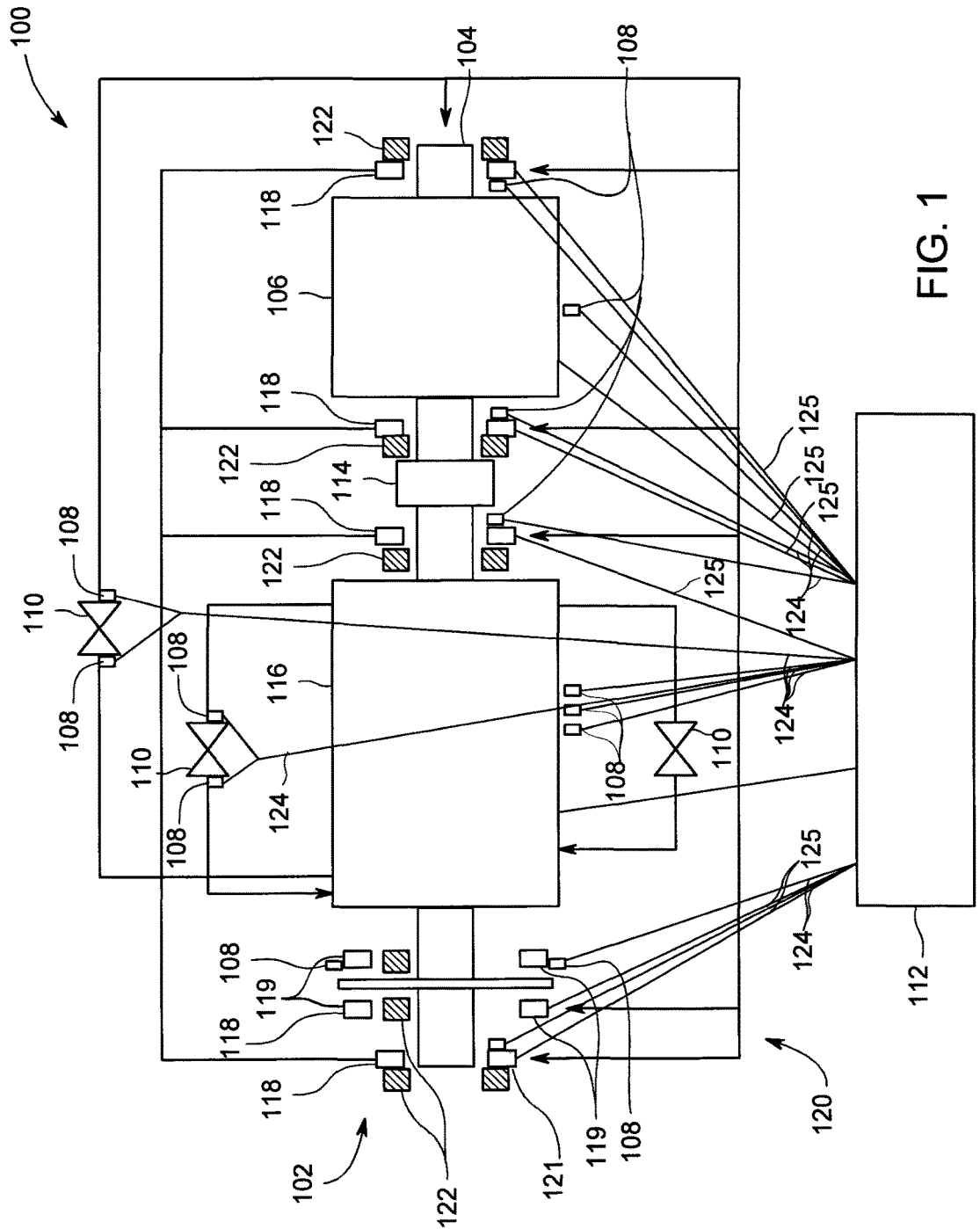
FIG. 1 is a schematic view of an exemplary rotary machine.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

The rotary machines described herein include active magnetic bearings and a rotor received in the active magnetic bearings. A controller of the rotary machine is configured to switch between a normal operating mode and a fault-tolerant operating mode. The controller switches to the fault-tolerant operating mode when a fault condition, such as a near-surge or near-choke state, of the rotary machine is detected. In the fault-tolerant operating mode, the controller utilizes a broad range of parameters to control the rotary machine for the limited time that the controller is in the fault-tolerant operating mode. In some embodiments, the controller powers down the system based on the detected condition and/or the operating mode of the controller. Moreover, the controller is a system level controller that reduces contact between the rotor and auxiliary bearings by controlling the active magnetic bearings and at least one other component of the rotary machine.

FIG. 1 is a schematic view of an exemplary rotary machine 100 including an active magnetic bearing (AMB) system 102. In the exemplary embodiment, rotary machine 100 includes AMB system 102, a rotor 104, a drive component 106, sensors 108, flow control devices 110, a controller 112, and a flexible coupling 114. Drive component 106 is coupled to rotor 104 and configured to induce rotation of rotor 104. In the exemplary embodiment, rotary machine 100 further includes a compressor 116 including plurality of centrifugal vanes that are coupled to rotor 104. The centrifugal vanes are spaced circumferentially about rotor 104 to define a centrifugal flow channel that extends between adjacent centrifugal vanes. The centrifugal flow channel is sized, shaped, and oriented to channel fluid through rotary machine 100 and to impart a centrifugal force to fluid to increase a pressure and a velocity of the fluid as rotor 104 is rotated. In the exemplary embodiment, rotary machine 100 includes a centrifugal compressor. In alternative embodiments, rotary machine 100 is any rotary machine. For example, in some embodiments, rotary machine 100 is any of the following, without limitation: a compressor, a blower, a pump, a turbine, a motor, and a generator.

AMB system 102 includes at least one electromagnetic bearing 118 that receives a portion of rotor 104 and rotatably supports rotor 104. In the exemplary embodiment, AMB system 102 includes a first electromagnetic bearing 118 located proximate one end of rotor 104, and a second electromagnetic bearing 118 positioned proximate the opposite end of rotor 104. A third electromagnetic bearing 118 and a fourth electromagnetic bearing 118 are located intermediate first electromagnetic bearing 118 and second electromagnetic bearing 118. A cooling system 120 is configured to regulate the temperature of electromagnetic bearings 118. In alternative embodiments, cooling system 120 cools any components of rotary machine 100.

In the exemplary embodiment, electromagnetic bearings 118 are configured for supporting rotor 104 in a non-contact, levitating state. In particular, electromagnetic bearings 118 include thrust actuators 119 and radial actuators 121. Thrust actuators 119 generate a magnetic field that regulates the position of rotor 104 in the axial direction. Radial actuators 121 generate a magnetic field that regulates the position of rotor 104 in the radial direction. As used herein, the term "axial" refers to a direction parallel to a rotation axis of rotor 104. The term "radial" refers to a direction perpendicular to the rotation axis of rotor 104. In alternative embodiments, AMB system 102 includes any electromagnetic bearings 118 that enable rotary machine 100 to operate as described herein. For example, in some embodiments, AMB system 102 includes hybrid actuators that include at least one permanent magnet and at least one electromagnet.

Also, in the exemplary embodiment, rotary machine 100 further includes auxiliary or landing bearings 122. Landing bearings 122 are bearings that are configured to receive rotor 104 when electromagnetic bearings 118 are unable to support rotor 104 and/or when electromagnetic bearings 118 are not powered. For example, in some embodiments, landing bearings 122 include any of the following, without limitation: journal bearings, ball bearings, and any other mechanical bearings. Rotor 104 contacts landings bearings 122 when rotor 104 experiences loads approaching, and potentially exceeding, the capacity of electromagnetic bearings 118. In addition, landing bearings receive rotor 104 during start-up and shut-down of system 100. In alternative embodiments, rotary machine 100 includes any auxiliary bearings that enable rotary machine 100 to operate as described.

In addition, in the exemplary embodiment, flow control devices 110 are valves that control flow of fluid through rotary machine 100. In particular, flow control devices 110 include recirculation valves, throttle valves, and cooling system valves. In alternative embodiments, rotary machine 100 includes any flow control devices that enable rotary machine 100 to operate as described herein. For example, in some embodiments, rotary machine 100 includes dampers (not shown) that control airflow through rotary machine 100.

Further, in the exemplary embodiment, sensors 108 are configured to detect operating characteristics of rotary machine 100, such as characteristics of AMB system 102. Sensors 108 are coupled to controller 112 and send signals 124 relating to the detected characteristics to controller 112. For example, at least one position sensor 108 is positioned adjacent each electromagnetic bearing 118. In the exemplary embodiment, each position sensor 108 is configured to determine an air gap distance (not shown) between rotor 104 and various locations around electromagnetic bearing 118. In the exemplary embodiment, a total air gap distance is known, thereby enabling the air gap distance for the various locations around each of electromagnetic bearing 118 to be calculated by subtracting the measured air gap distance from the total air gap distance. In alternative embodiments, AMB system 102 includes any sensors that enable AMB system 102 to function as described herein. For example, in some embodiments, AMB system 102 includes any of the following, without limitation: eddy-current position sensors, inductive sensors, optical sensors, and capacitive sensors.

Also, in the exemplary embodiment, at least some sensors 108 are configured to detect characteristics of flow through rotary machine 100. For example, in the illustrated embodiment, some sensors 108 are coupled to fluid lines and detect the flow rate through rotary machine 100. In alternative embodiments, rotary machine 100 includes any sensors 108 that enable rotary machine 100 to operate as described herein.

Figure 2:
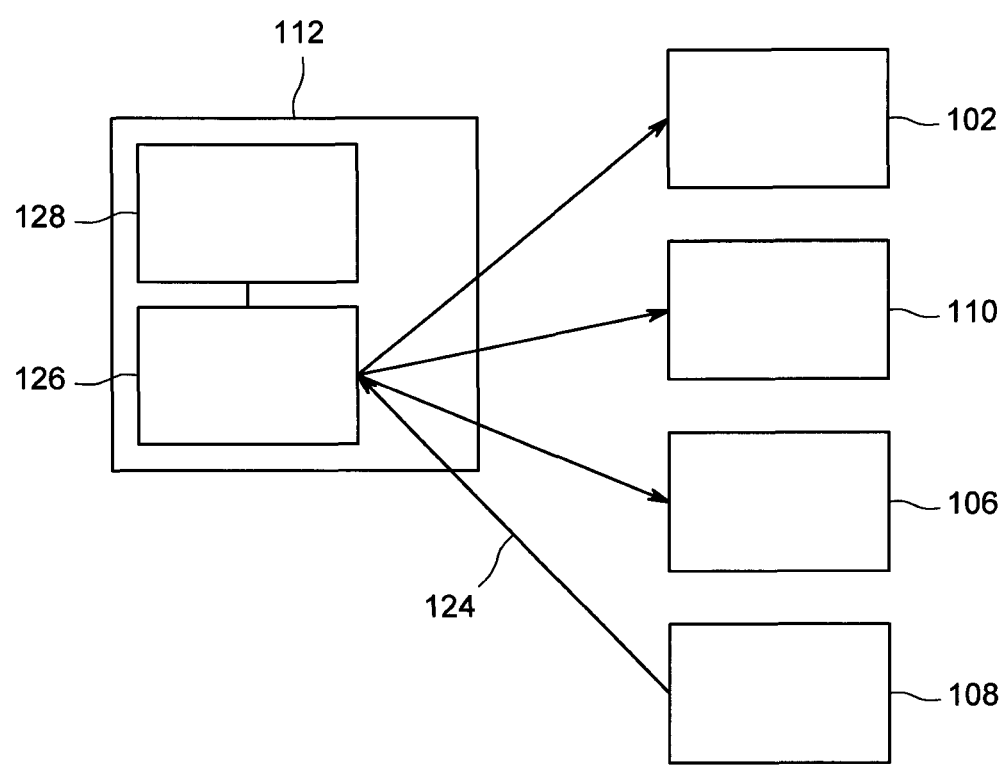
FIG. 2 is a schematic view of a controller of the rotary machine shown in FIG. 1.

FIG. 2 is a schematic view of controller 112 for rotary machine 100. Controller 112 is communicatively coupled to electromagnetic bearings 118, sensors 108, flow control devices 110, and drive component 106. Controller 112 sends signals 125 to electromagnetic bearings 118, flow control devices 110, and/or drive component 106 to regulate electromagnetic bearings 118, flow control devices 110, and/or drive component 106 to control rotary machine 100. Controller 112 is configured to execute operations to control rotary machine 100 based at least partially on signals 124 transmitted to controller 112 by sensors 108. In some embodiments, controller 112 uses a plurality of driver control variables to execute operations. For example, in some embodiments, controller 112 accounts for motor current, power, and any other variables. Operations executed by controller 112 include sensing or modeling operating parameters, modeling operational boundaries, applying operational boundary models, and applying control algorithms to control operation of AMB system 102. In the exemplary embodiment, signals 124 relate to any characteristics of rotary machine 100. For example, some signals 124 are representative of the air gap distance between rotor 104 and a respective one of electromagnetic bearings 118. In some embodiments, controller 112 regulates an amount of magnetic force generated by actuators of electromagnetic bearings 118 to adjust the air gap between rotor 104 and the actuators to a desired amount. I Moreover, based at least partially on the detected characteristics, controller 112 determines an operating state of rotary machine 100. In particular, controller 112 determines an operating state of rotary machine 100 by locating operating points of rotary machine 100 on operating maps, identifying fault tolerant control areas, measuring distances to surge and choke lines, locating desired operating points, and/or determining variability of operating points. In some embodiments, controller 112 determines fault conditions and/or events of rotary machine 100 based on stall and surge indicators and AMB internal variables such as control currents and rotor position. In further embodiments, controller 112 uses mechanical, electrical, and/or thermodynamic characteristics such as bearing currents, pressures, temperatures, volume flow rate, and mass flow rates as indicators of fault conditions. In alternative embodiments, controller 112 determines the operating state of rotary machine 100 in any manner that enables rotary machine 100 to operate as described herein.

In the exemplary embodiment, controller 112 is configured to adjust electromagnetic bearings 118 and/or flow control devices 110 based on the determined operating state and based on operating parameters. For example, controller 112 adjusts electromagnetic bearings 118 to inhibit rotor 104 contacting landing bearings 122 due to high dynamic loads induced by counter-surge measures. Control strategies for inhibiting rotor 104 contacting landing bearings 122 include adjusting any of the following components, without limitation: thrust AMB actuators, recirculation valves, throttle valves, cooling system valves, compressor drivers, and/or radial AMB actuators. In alternative embodiments, controller 112 regulates any components of rotary machine 100 that enable rotary machine 100 to operate as described herein.

Also, in the exemplary embodiment, controller 112 includes a processor 126 and a memory 128 coupled to processor 126. Processor 126 includes one or more processing units (e.g., in a multi-core configuration) for executing instructions. In some implementations, executable instructions are stored in memory 128. In particular, memory 128 is configured to store operating modes of controller 112. The operating modes include a normal operating mode and a fault tolerant operating mode. Memory 128 also stores parameters for controlling the operation of AMB system 102. Memory 128 is any device that allows information such as executable instructions and/or other data to be stored and retrieved. In alternative embodiments, controller 112 includes any memory that enables rotary machine 100 to operate as described herein.

In addition, in the exemplary embodiment, processor 126 is configured to receive signals 124 from sensors 108 and determine an operating state of rotary machine 100 based on signals 124. Processor 126 is further configured to switch operating modes based on the determined operating state of rotary machine 100. For example, processor 126 is configured to switch from a normal operating mode to a fault tolerant operating mode when a fault condition of rotary machine 100 is detected. In alternative embodiments, controller 112 has any configuration that enables rotary machine 100 to operate as described herein.

Further, in the exemplary embodiment, controller 112 regulates electromagnetic bearings 118 based on a first set of parameters in the normal operating mode and based on a second set of parameters in the fault tolerant operating mode. For example, in the fault tolerant operating mode, controller 112 utilizes parameters based on standards that are less rigorous than standards utilized in the normal operating modes, i.e., parameters that define a broader range of operation with decreased margins compared to established ratings. For example, standards such as those issued by the International Organization for Standardization (ISO) and the American Petroleum Institute (API) include criteria for vibration levels, stability, and robustness for long term operation of machines equipped with AMB Systems. The first set of parameters satisfies the applicable standards for long term operation of rotary machine 100. The second set of parameters is not required to satisfy the long term operating criteria because the second set of parameters is used for short term operation of rotary machine 100. Accordingly, the second set of parameters includes at least one parameter that is not included in the first set of parameters. Controller 112 is configured to operate in the fault tolerant operating mode for a limited time because controller 112 is utilizing the short term parameters. When controller 112 has operated in the fault tolerant operating mode for a predetermined time, controller 112 is configured to perform at least one of the following operations: powering off rotary machine 100 and switching between the fault and normal operating modes. In alternative embodiments, controller 112 utilizes any parameters that enable rotary machine 100 to operate as described herein.

Figure 3:
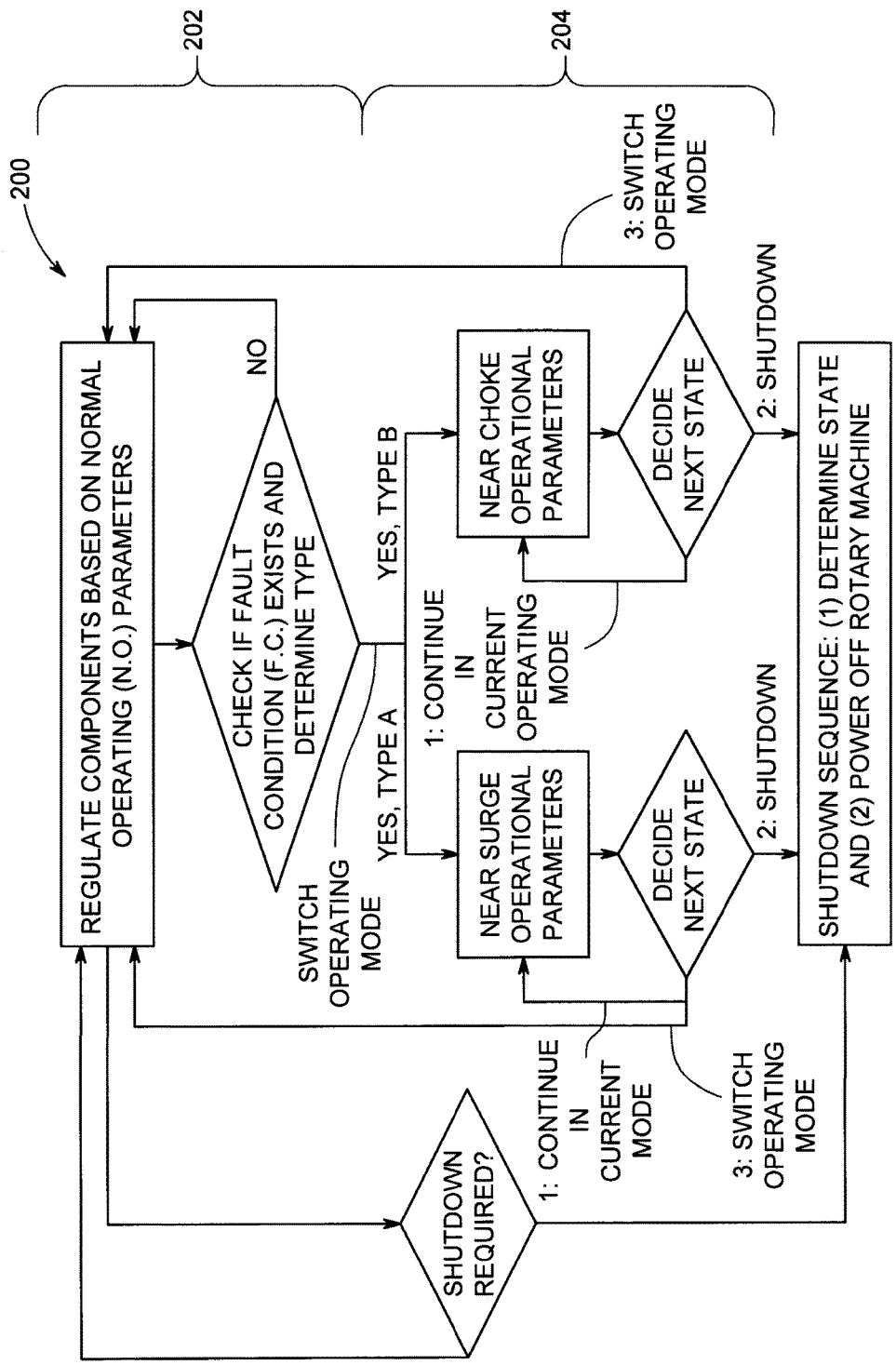
FIG. 3 is a flow chart of operation of the controller shown in FIG. 2.

FIG. 3 is a flow chart 200 illustrating operation of controller 112 (shown in FIG. 1). In reference to FIGS. 1 and 3, controller 112 monitors operation of rotary machine 100 based on information received from sensors 108. Controller 112 starts in a normal operating mode 202 and regulates rotary machine 100 based on a first set of parameters. If controller 112 detects a fault condition, controller 112 switches to a fault tolerant operating mode 204 and regulates rotary machine 100 based on a second set of parameters to accommodate the fault condition. For example, controller switches to fault tolerant operating mode 204 if controller 112 determines rotary machine 100 is operating in a near-surge condition or a near-choke condition.

When controller 112 determines rotary machine 100 is operating in a fault condition, controller 112 regulates any components of rotary machine 100 to accommodate the fault condition. For example, when a detected operating characteristic indicates a near-surge condition, controller 112 regulates an anti-surge valve (ASV), the speed of drive component 106, and the position of electromagnetic bearings 118 to facilitate operation of rotary machine 100 away from the near-surge condition. When a near-choke condition is detected, controller 112 regulates the speed of drive component 106, the position of a throttle valve, and the position of electromagnetic bearings 118 to facilitate operation of rotary machine 100 away from the near-choke condition.

In some embodiments, electromagnetic bearings 118 are adjusted to change the set point for levitating rotor 104 and reduce static forces such as those occurring during a near-choke condition of rotary machine 100. In particular, the magnetic forces on rotor 104 are balanced by determining a disturbance and adjusting the levitation set point accordingly. The levitation set point is adjusted by adjusting the thrust actuators of electromagnetic bearings 118. In further embodiments, active magnetic bearings 118 are adjusted based on position-independent control, in which an electronic multiplier is used to multiply a controller signal by an output signal from sensor 108 to determine a force independent of the size of the air gap. In some embodiments, flow control devices 110, such as a throttle valve, are controlled based on AMB system currents, operating maps, the system design, and the displacement of rotor 104.

When controller 112 determines rotary machine 100 is no longer in the fault condition, controller 112 returns to normal operating mode 202. Controller 112 continues to monitor the operating state of rotary machine 100 throughout operation of rotary machine 100 and switches operating modes 202, 204 as necessary. In some embodiments, controller 112 is a multiple input multiple output (MIMO) controller. In alternative embodiments, rotary machine 100 includes any controller 112 that enables rotary machine 100 to operate as described herein.

When controller 112 determines a shutdown is required in any operating mode, controller 112 powers off rotary machine 100. Controller 112 determines a state of rotary machine 100 prior to initiating the shutdown sequence. For example, in some embodiments, controller 112 determines if a shutdown of rotary machine 100 is required in normal operating mode 202 and powers off rotary machine 100 based on a determined state of rotary machine 100. In further embodiments, controller 112 powers off rotary machine 100 when rotary machine 100 has operated in fault tolerant operating mode 204 for a predetermined time. In alternative embodiments, rotary machine 100 is shutdown in any manner that enables rotary machine 100 to operate as described herein.

Figure 4:
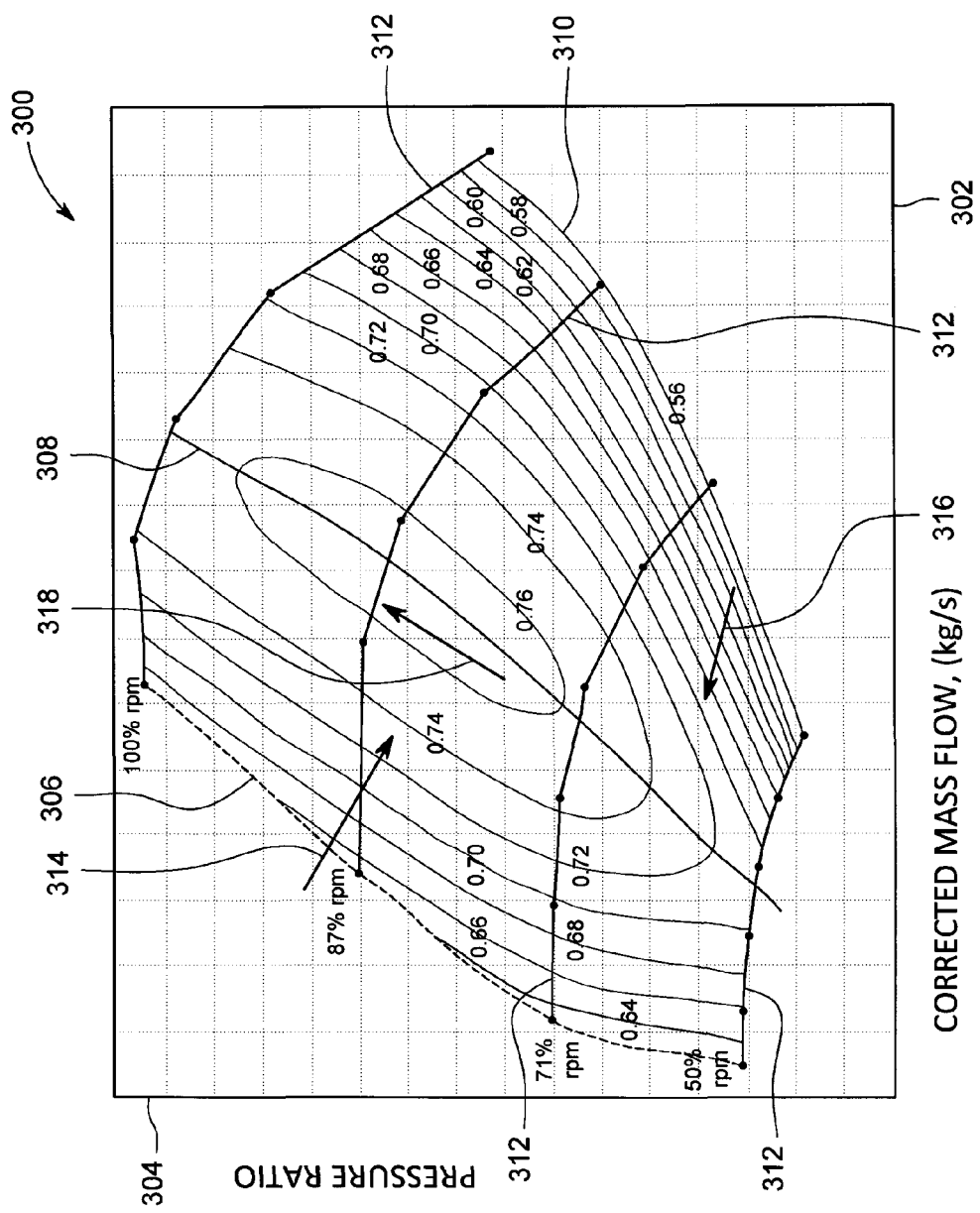
FIG. 4 is a graphical representation of flow through the rotary machine shown in FIG. 1.

FIG. 4 is a graphical representation of flow through rotary machine 100 (shown in FIG. 1). FIG. 4 includes a graph 300 including an x-axis 302 defining mass flow rate (in units of kilograms per second (kg/s)) and a y-axis 304 defining pressure ratio (unitless). Graph 300 further includes a surge line 306, a peak efficiency line 308, and a choke line 310.

Referring to FIGS. 1 and 4, surge line 306 represents operation of rotary machine 100 in a surge condition. For example, surge occurs when rotary machine 100 includes a compressor that is pulling in gas faster than the compressor is expelling the gas. The pressure in the compressor rises inducing the compressor to slow down until a near instantaneous release of the trapped gas induces a rapid acceleration of the affected compressor, thereby repeating the cycle of surging. Choke line 310 represents operation of rotary machine 100 in a choke condition. For example, choke occurs when rotary machine 100 includes a compressor that is operating at a maximum flow rate with a low outlet pressure.

Peak efficiency line 308 extends between surge line 306 and choke line 310 and defines flow characteristics when rotary machine 100 (shown in FIG. 1) is operating at peak efficiency. A plurality of rotational speed lines 312 extend between surge line 306 and choke line 310. Rotational speed lines 312 represent the rotational speed of rotor 104 (shown in FIG. 1). In particular, rotational speed lines 312 represent rotor 104 (shown in FIG. 1) rotating at approximately 50%, 71%, 87%, and 100% of the maximum speed of rotor 104 (shown in FIG. 1). In addition, graph 300 includes arrow 314, arrow 316, and arrow 318. Arrow 314 indicates a shift in operation of rotary machine 100 (shown in FIG. 1) due to opening of an anti-surge valve. Arrow 316 indicates a shift in operation of rotary machine 100 (shown in FIG. 1) due to opening of a throttle valve. Arrow 318 indicates a shift in operation of rotary machine 100 (shown in FIG. 1) due to an increase in rotational speed of rotor 104 (shown in FIG. 1).

In reference to FIGS. 1 and 4, rotary machine 100 is configured to operate as close to peak efficiency line 308 as possible. When operation of rotary machine 100 varies from peak efficiency line 308 and approaches surge line 306 or choke line 310, rotary machine 100 enters a near surge or near choke state. When controller 112 determines that rotary machine 100 has entered such a state, controller 112 adjusts components of rotary machine 100 to facilitate operation of rotary machine closer to peak efficiency line 308. For example, in some embodiments, controller 112 opens an anti-surge valve to shift operation of rotary machine 100 away from surge line 306 in the direction of arrow 314. In further embodiments, controller 112 opens a throttle valve to shift operation of rotary machine 100 away from choke line 310 in the direction of arrow 316. In particular, operation of rotary machine 100 is moved away from surge line 306 towards peak efficiency line 308 when a near surge condition is detected and operation of rotary machine 100 is moved away from choke line 310 towards peak efficiency line 308 when a near choke condition is detected.

Figure 5:
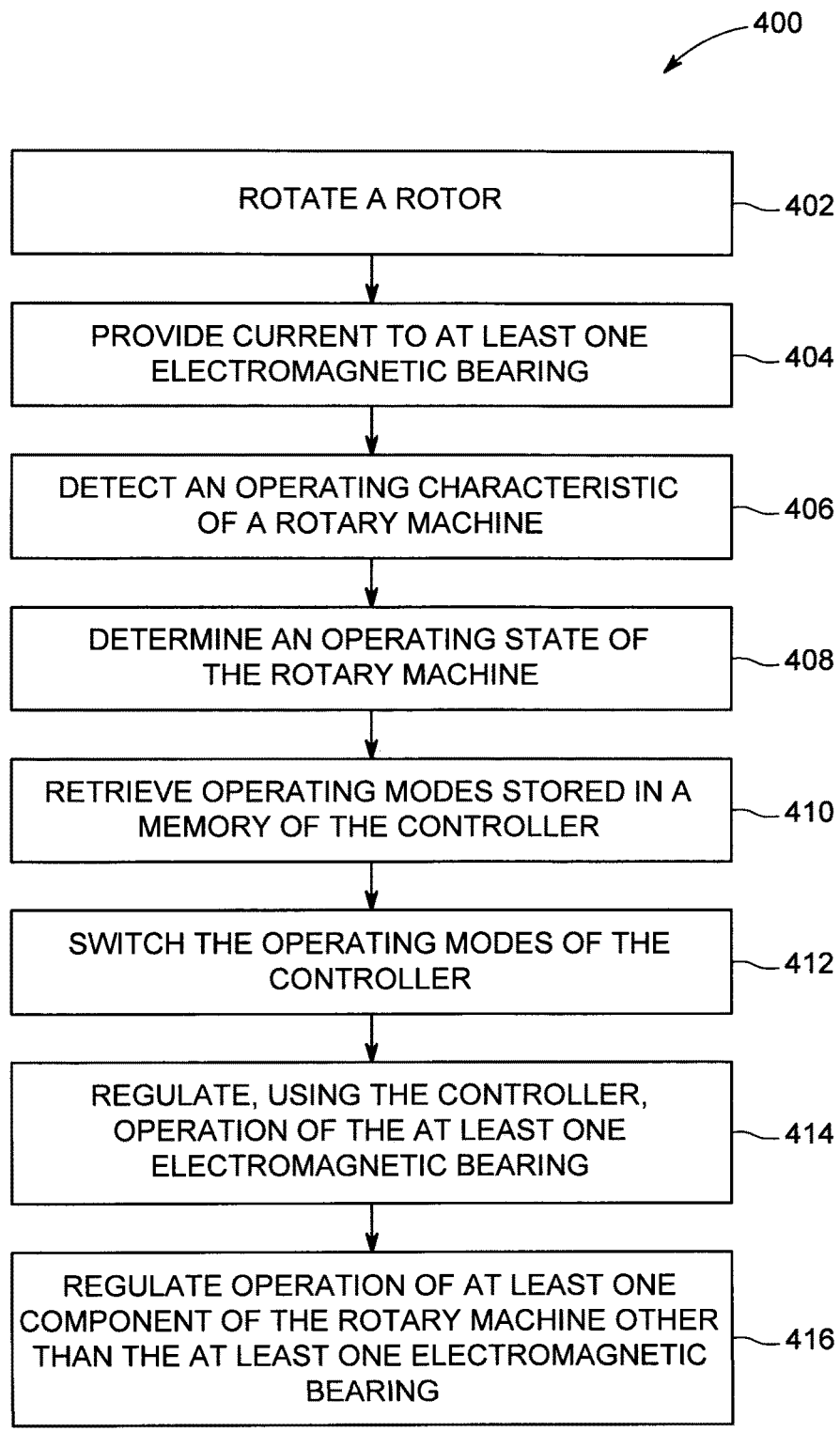
FIG. 5 is a flow chart of an exemplary method for controlling the rotary machine shown in FIG. 1.

FIG. 5 is a flow chart of an exemplary method 400 for controlling rotary machine 100 (shown in FIG. 1). Referring to FIGS. 1, 2, 3, and 5, method 400 includes rotating 402 rotor 104 and providing 404 current to electromagnetic bearing 118 supporting rotor 104. Method 400 also includes detecting 406 an operating characteristic of rotary machine 100. Method 400 further includes determining 408, using controller 112, an operating state of rotary machine 100 based on the detected operating characteristic. Method 400 also includes retrieving 410 operating modes stored in memory 128. The operating modes include a normal operating mode 202 and a fault tolerant operating mode 204. Method 400 further includes switching 412 operating modes 202, 204 based on the determined operating state of rotary machine 100. Method 400 also includes regulating 414, using controller 112, operation of electromagnetic bearing 118. Controller 112 regulates electromagnetic bearing 118 in normal operating mode 202 based on a first set of parameters and regulates electromagnetic bearing 118 in fault tolerant operating mode 204 based on a second set of parameters. The second set of parameters includes at least one parameter that is not included in the first set of parameters. Method 400 further includes regulating 416, using controller 112, operation of at least one component of rotary machine 100 other than electromagnetic bearing 118.

The above-described rotary machines include active magnetic bearings and a rotor received in the active magnetic bearings. A controller of the rotary machine is configured to switch between a normal operating mode and a fault-tolerant operating mode. The controller switches to the fault-tolerant operating mode when a fault condition, such as a near-surge or near-choke state, of the rotary machine is detected. In the fault-tolerant operating mode, the controller utilizes a broad range of parameters to control the rotary machine for the limited time that the controller is in the fault-tolerant operating mode. Moreover, the controller is a system level controller that reduces contact between the rotor and auxiliary bearings by controlling the active magnetic bearings and at least one other component of the rotary machine.

An exemplary technical effect of the methods, systems, and apparatus described herein includes at least one of: (a) increasing efficiency of rotary machines by utilizing short term operating parameters to control the rotary machines during fault conditions; (b) reducing the number of rotor landings of rotary machines; (c) reducing the cost to assemble and maintain rotary machines; (d) increasing the service life of rotary machines; and (e) providing enhanced detection and correction of fault operating states of the rotary machines.

Exemplary embodiments of methods for controlling a rotary machine are described above in detail. The system and methods described herein are not limited to the specific embodiments described, but rather, components of systems and/or steps of the methods may be utilized independently and separately from other components and/or steps described herein. For example, the methods may also be used in combination with other magnetic bearing systems and detection methods, and are not limited to practice with only the systems and methods, as is described herein. Rather, the exemplary embodiments can be implemented and utilized in connection with many other applications, equipment, and systems that may benefit from the advantages described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, a personal computer microprocessor, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A controller for a rotary machine, said controller coupled to at least one electromagnetic bearing, at least one sensor, and at least one fluid flow control device, said controller comprising:
 a processor; and
 a memory coupled to said processor, said memory configured to store operating modes of said controller, the operating modes including a normal operating mode and a fault tolerant operating mode, wherein said controller is configured to:
  receive a signal from the at least one sensor and determine an operating states of the rotary machine based on the signal;
  switch between the normal operating mode and the fault tolerant operating mode based on the determined operating state of the rotary machine;

regulate at least one of a magnetic force and a position of the at least one electromagnetic bearing and at least one of a position and an opening of the at least one fluid flow control device; and operate the rotary machine at a peak efficiency line during the fault tolerant operating mode based on regulation of at least one of the magnetic force and the position of the at least one electromagnetic bearing and at least one of the position and the opening of the at least one fluid flow control device.

2. The controller in accordance with claim 1, wherein said controller is further configured to regulate the at least one electromagnetic bearing in the normal operating mode based on a first set of parameters, and said controller is further configured to regulate the at least one electromagnetic bearing in the fault tolerant operating mode based on a second set of parameters, the second set of parameters including at least one parameter that is not included in the first set of parameters.

3. The controller in accordance with claim 1, wherein said controller is further configured to perform at least one of following operations when said controller has operated in the fault tolerant operating mode for a predetermined time: switching between the normal operating mode and the fault tolerant operating mode and powering off the rotary machine.

4. The controller in accordance with claim 1, wherein said controller is further configured to initiate a shutdown sequence, the shutdown sequence including determining a state of said rotary machine and powering off said rotary machine.

5. The controller in accordance with claim 1, wherein said controller is further configured to determine if at least one operating characteristic of said rotary machine is indicative of a choke condition of a compressor.

6. A rotary machine comprising:
a rotor;
a drive component coupled to said rotor and configured to induce rotation of said rotor;
at least one electromagnetic bearing configured to support a portion of said rotor;
at least one sensor configured to detect an operating characteristic of said rotary machine;
at least one fluid flow control device; and
a controller coupled to said at least one electromagnetic bearing, said at least one sensor, and said at least one fluid flow control device, said controller configured to regulate said at least one electromagnetic bearing and said at least one fluid flow control device, said controller comprising:
a processor; and
a memory coupled to said processor, said memory configured to store operating modes of said controller, the operating modes including a normal operating mode and a fault tolerant operating mode, wherein said controller is further configured to:

receive a signal from said at least one sensor and determine an operating state of said rotary machine based on the signal;

switch between the normal operating mode and the fault tolerant operating mode based on the determined operating state of said rotary machine;

regulate at least one of a magnetic force and a position of the at least one electromagnetic bearing and at least one of a position and an opening of the at least one fluid flow control device; and operate the rotary machine at a peak efficiency line during the fault tolerant operating mode based on regulation of at least one of the magnetic force and the position of the at least one electromagnetic bearing during and at least one of the position and the opening of the at least one fluid flow control device.

7. The rotary machine in accordance with claim 6, wherein said controller is further configured to regulate said at least one electromagnetic bearing in the normal operating mode based on a first set of parameters, and said controller is further configured to regulate said at least one electromagnetic bearing in the fault tolerant operating mode based on a second set of parameters, the second set of parameters including at least one parameter that is not included in the first set of parameters.

8. The rotary machine in accordance with claim 6, wherein said controller is further configured to perform at least one of following operations when said controller has operated in the fault tolerant operating mode for a predetermined time: switching between the normal operating mode and the fault tolerant operating mode and powering off said rotary machine.

9. The rotary machine in accordance with claim 6, further comprising nonmagnetic bearings spaced from said rotor in a thrust direction, said controller further configured to inhibit said rotor contacting said nonmagnetic bearings.

10. The rotary machine in accordance with claim 6, wherein said controller is further configured to initiate a shutdown sequence, the shutdown sequence including determining a state of said rotary machine and powering off said rotary machine.

11. The rotary machine in accordance with claim 6, wherein said at least one sensor is configured to detect a bearing current of said at, least one electromagnetic bearing.

12. The rotary machine in accordance with claim 6, wherein said rotary machine comprises a compressor, and wherein said controller is further configured to determine if the at least one operating characteristic of said rotary machine is indicative of a near choke condition or an increased volume flow condition of said compressor.

13. The rotary machine in accordance with claim 12, wherein said at least one fluid flow control device comprises at least one of a recirculation valve, a throttle valve, and a cooling system valve.

* * * * *